United States Patent [19]

Vessey et al.

[11] Patent Number: 4,523,673

[45] Date of Patent: Jun. 18, 1985

[54] TRANSFER DEVICE

[75] Inventors: John R. Vessey, Linden; Chandrakant M. Patel, Flint; Jack Armstrong, Fenton, all of Mich.

[73] Assignee: Excel Corporation, Fenton, Mich.

[21] Appl. No.: 448,260

[22] Filed: Dec. 9, 1982

[51] Int. Cl.³ .............................................. B65G 25/00
[52] U.S. Cl. .................................. 198/486; 198/575; 414/336
[58] Field of Search .............. 198/486, 488, 575, 576; 414/744 R, 744 A, 226, 334, 336

[56] References Cited

U.S. PATENT DOCUMENTS 2,525,572 10/1950 Woody et al. .................. 414/415 X
3,272,360 9/1966 van der Schoot .............. 198/486 X
3,805,944 4/1974 Yuryan ................................ 198/486

FOREIGN PATENT DOCUMENTS 2411789 7/1979 France ................................ 414/744
897666 5/1962 United Kingdom ........... 414/744 A Primary Examiner—Joseph E. Valenza
Assistant Examiner—Jonathan D. Holmes
Attorney, Agent, or Firm—Gifford, VanOphem, Sheridan, Sprinkle & Nabozny

[57] ABSTRACT

A device is disclosed for transferring workpieces from an entry station and to a predetermined position on a continuously moving conveyor. The device comprises a housing wherein at least a portion of the conveyor extends through and is movable along a predetermined path of movement through the housing. A carriage assembly is movably mounted to the housing along the path of movement and is movable from a first position in which the carriage assembly is aligned with the entry station and a second position which is spaced from its first position along the path of movement. The carriage assembly includes arms which engage and receive a workpiece from the entry station. Thereafter, a coupling member on the carriage engages an abutment member on the conveyor so that the carriage assembly and conveyor move in unison with each other. The carriage assembly arms release the work onto the conveyor when the carriage assembly reaches the second position and an air spring thereafter returns the carriage assembly to its first position for receipt of a subsequent workpiece.

9 Claims, 6 Drawing Figures

TRANSFER DEVICE

BACKGROUND OF THE INVENTION

I. Field of the Invention

The present invention relates generally to transfer devices and, more particularly, to such a device for moving workpieces from an entry station and to a predetermined position on a moving conveyor.

II. Description of the Prior Art

There are a number of previously known transfer mechanisms for moving workpieces from an entry station and to a moving conveyor. In many applications, however, it is necessary that the workpiece be transferred to the conveyor at a predetermined position on the conveyor and this is particularly true were a machining operation, such as grinding, is performed while the workpiece is on the conveyor.

In many of the previously known transfer mechanisms where it is necessary that the workpiece be placed at a predetermined position on the conveyor, the conveyor is indexed and thus stops while each part is loaded from the entry station. These previously known transfer mechanisms, while effective for accurately positioning the workpiece at predetermined positions on the conveyor, are unsuitable for certain machining operations. Furthermore, these previously known indexing conveyors are relatively inefficient in operation since the conveyor must be stopped each time a workpiece is loaded onto the conveyor.

SUMMARY OF THE PRESENT INVENTION

The present invention provides an improved transfer mechanism for transferring workpieces from an entry station and to a conveyor which overcomes the above mentioned disadvantages of the previously known devices.

In brief, the device of the present invention comprises a housing, wherein at least a portion of the moving conveyor passes through the housing along a predetermined path of movement. A carriage assembly is slidably mounted to the housing between a first and second position so that the carriage assembly is movable along the path of movement. In its first position, the carriage assembly is aligned with the entry station while in its second position, the carriage assembly is spaced from the entry station.

The carriage assembly includes means for receiving and holding a workpiece from the entry station when the carriage assembly is in its first position. After receipt of a workpiece by the carriage assembly, coupling means are actuated which moves a coupling member into alignment with one or more raised abutment members on the conveyor.

Upon engagement of the abutment member with the coupling member, the conveyor moves the carriage assembly in unison with the conveyor along the predetermined path of movement and towards the second position. When the carriage assembly reaches its second position, the carriage assembly releases the workpiece onto the conveyor and the coupling means is then deactuated thus disengaging the carriage assembly from the conveyor. An air spring thereafter returns the carriage assembly to its first position for receipt of a subsequent workpiece.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 5 is a fragmentary side view taken substantially along lines 5—5 in FIG. 1, with parts removed and enlarged for clarity.

DETAILED DESCRIPTION OF A PREFERRED EMBODIMENT OF THE PRESENT INVENTION

Figure 1:
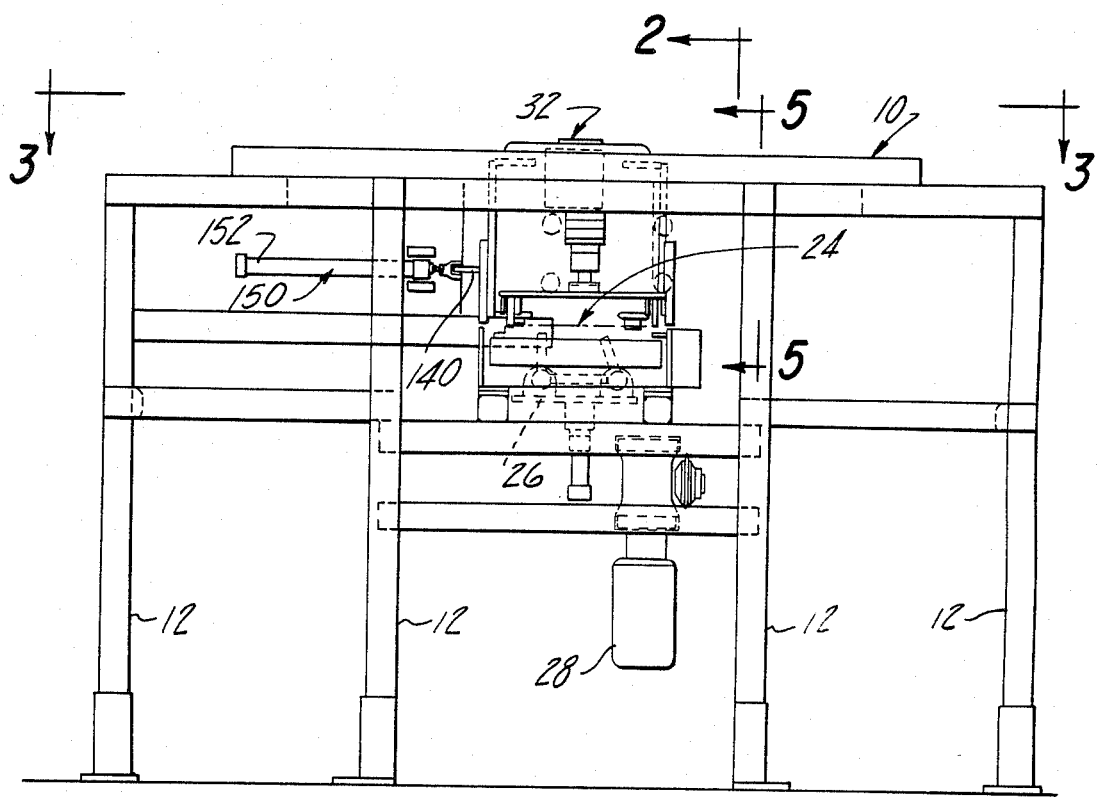
FIG. 1 is a front view illustrating a first preferred embodiment of the invention.
Figure 2:
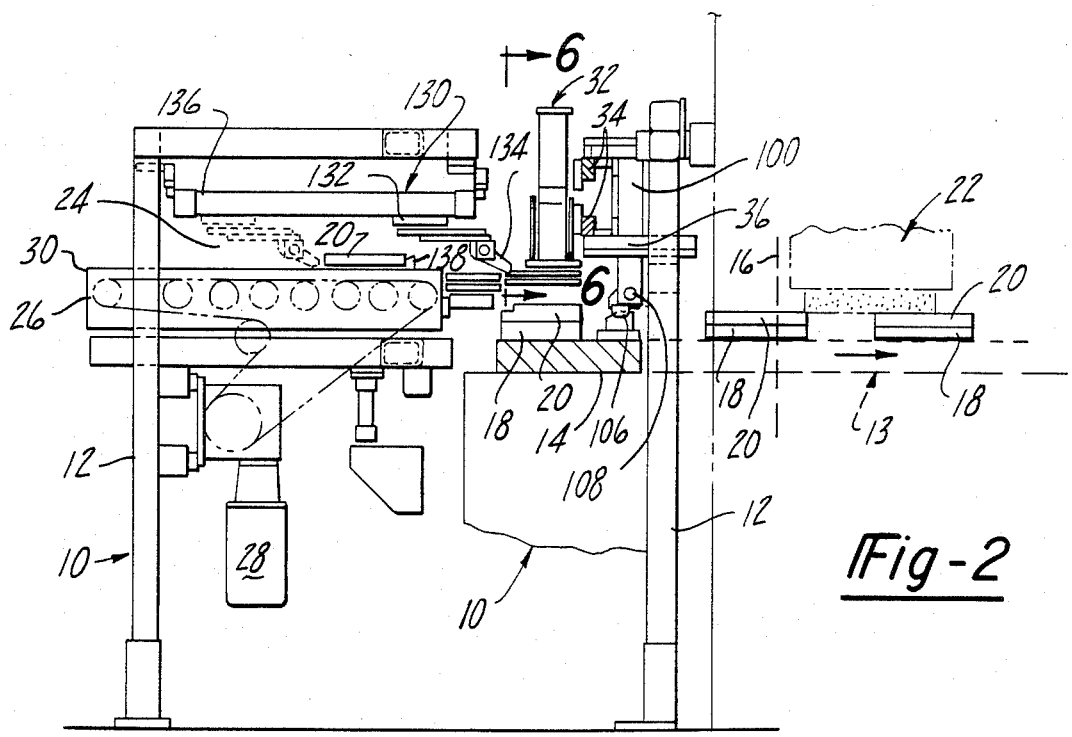
FIG. 2 is a side view illustrating the preferred embodiment of the invention and taken substantially along line 2—2 in FIG. 1.
Figure 3:
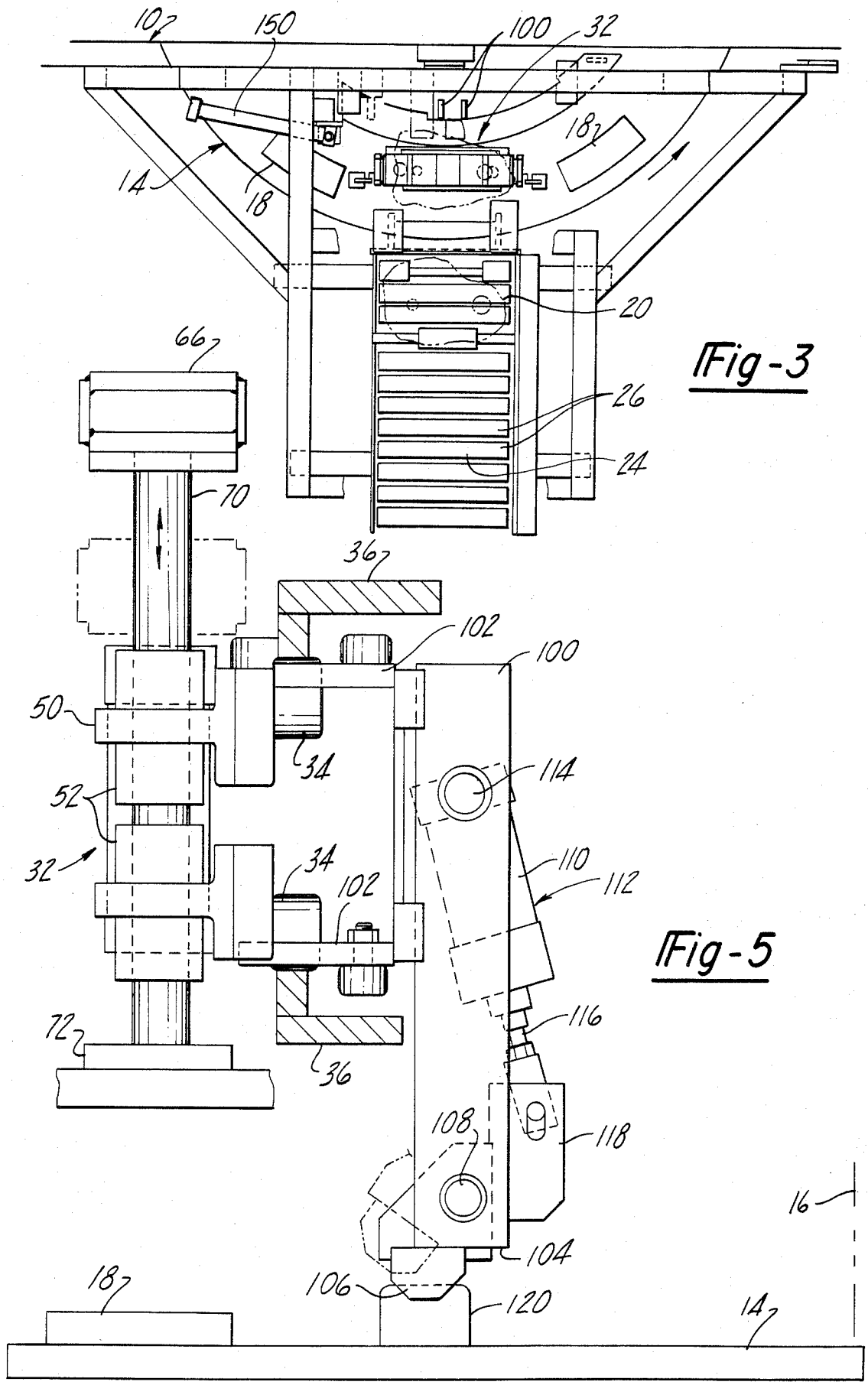
FIG. 3 is a top view of the preferred embodiment of the invention with parts removed for clarity and taken substantially along line 3—3 in FIG. 1.

With reference first to FIGS. 1-3, a preferred embodiment of the transfer mechanism of the present invention is thereshown and comprises a housing 10 having framing members 12. A conveyor 13 extends through at least a portion of the housing 10.

As best shown in FIGS. 2 and 3, the conveyor 13 is illustrated as a machine dial index table which comprises a conveyor wheel 14. The wheel 14 may be either continuously rotatably driven about its vertical axis 16 by conventional motor means (not shown) or may be indexed between definite stops during each cycle. A plurality of circumferentially spaced workpiece holding stations 18 are secured at circumferentially spaced positions around the outer periphery of the conveyor wheel 14 and each station 18 is adapted to receive and hold a workpiece 20 in a predetermined position or overtation. A machining operation, such as a grinding operation illustrated diagrammatically at 22, is performed on each workpiece 20 as the conveyor 14 is rotatably driven. Means, not shown, are provided for unloading the workpieces 20 from the conveyor wheel 14 following completion of the machining operation 22.

With reference again to FIGS. 1-3, an entry station 24 is formed in the housing 10 from which the workpieces 20 are received and loaded onto the work holding stations 18 on the conveyor wheel 14. The entry station 24 includes a roller conveyor 26 which is rotatably driven by a motor 28 to propel the workpiece 20 from an outer end 30 of the conveyor 26 and radially toward the conveyor wheel 14. In addition, the entry station 24 is spaced upwardly from the conveyor wheel 14.

Figure 4:
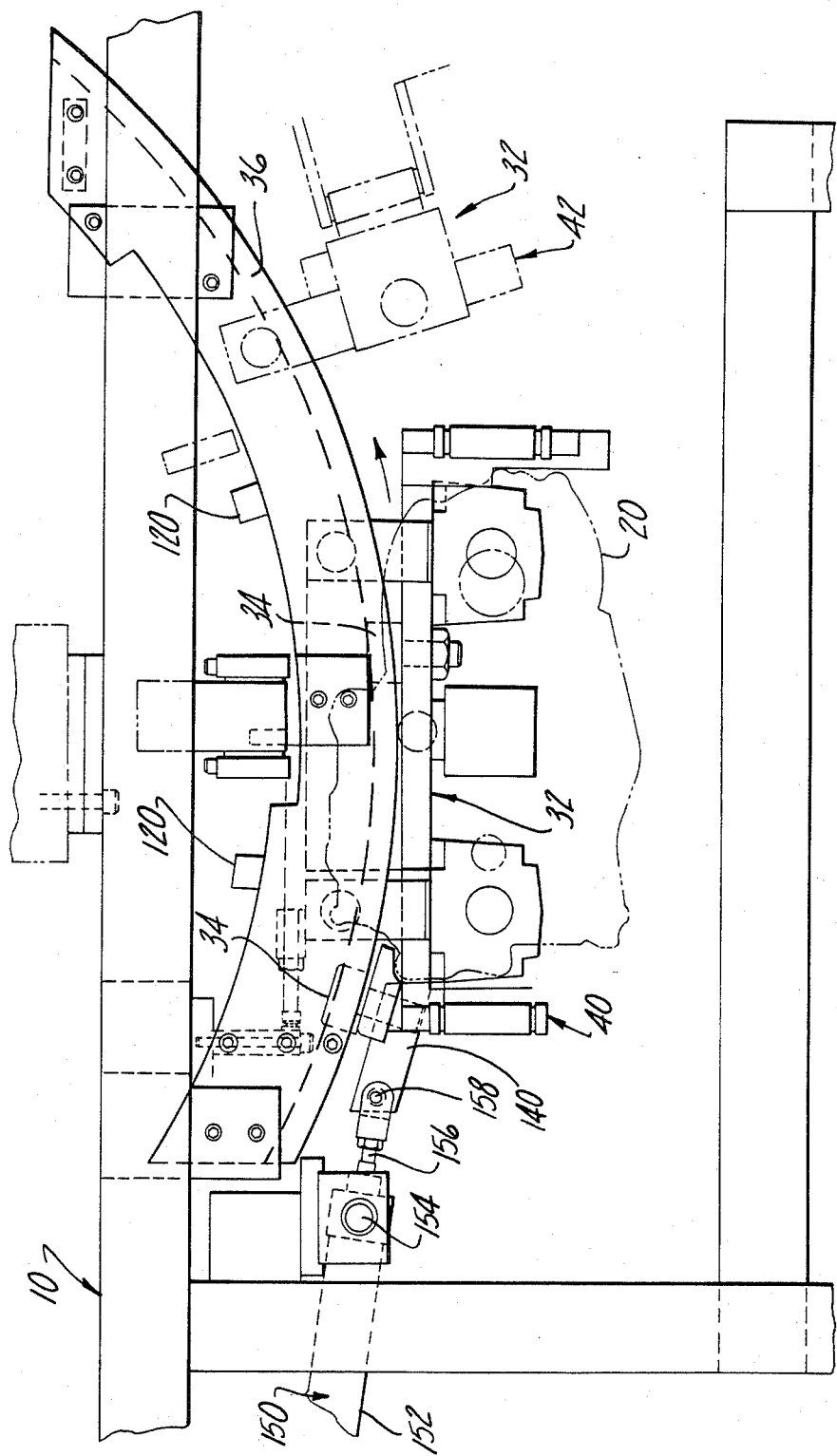
FIG. 4 is a top view of the preferred embodiment of the invention with parts removed and enlarged for clarity.

With reference now to FIGS. 2, 4 and 5, a carriage assembly 32 is provided for transferring the workpieces 20 from the entry station 24 and to the work holding stations 18 on the conveyor wheel 14 in a fashion which will subsequently be described in greater detail. The carriage assembly 32 is slidably mounted to the housing 10 by rollers 34 which rotatably engage spaced housing rails 36. In addition, as best shown in FIGS. 2 and 4, the rails 36 are arcuately formed along the radius of curvature of the conveyor wheel 14 and allow the carriage assembly 32 to move horizontally along the path of movement of the rotating conveyor wheel 14 from a first position 40, shown in solid line in FIG. 4, and to a second position 42, shown in phantom line in FIG. 4.

Figure 6:
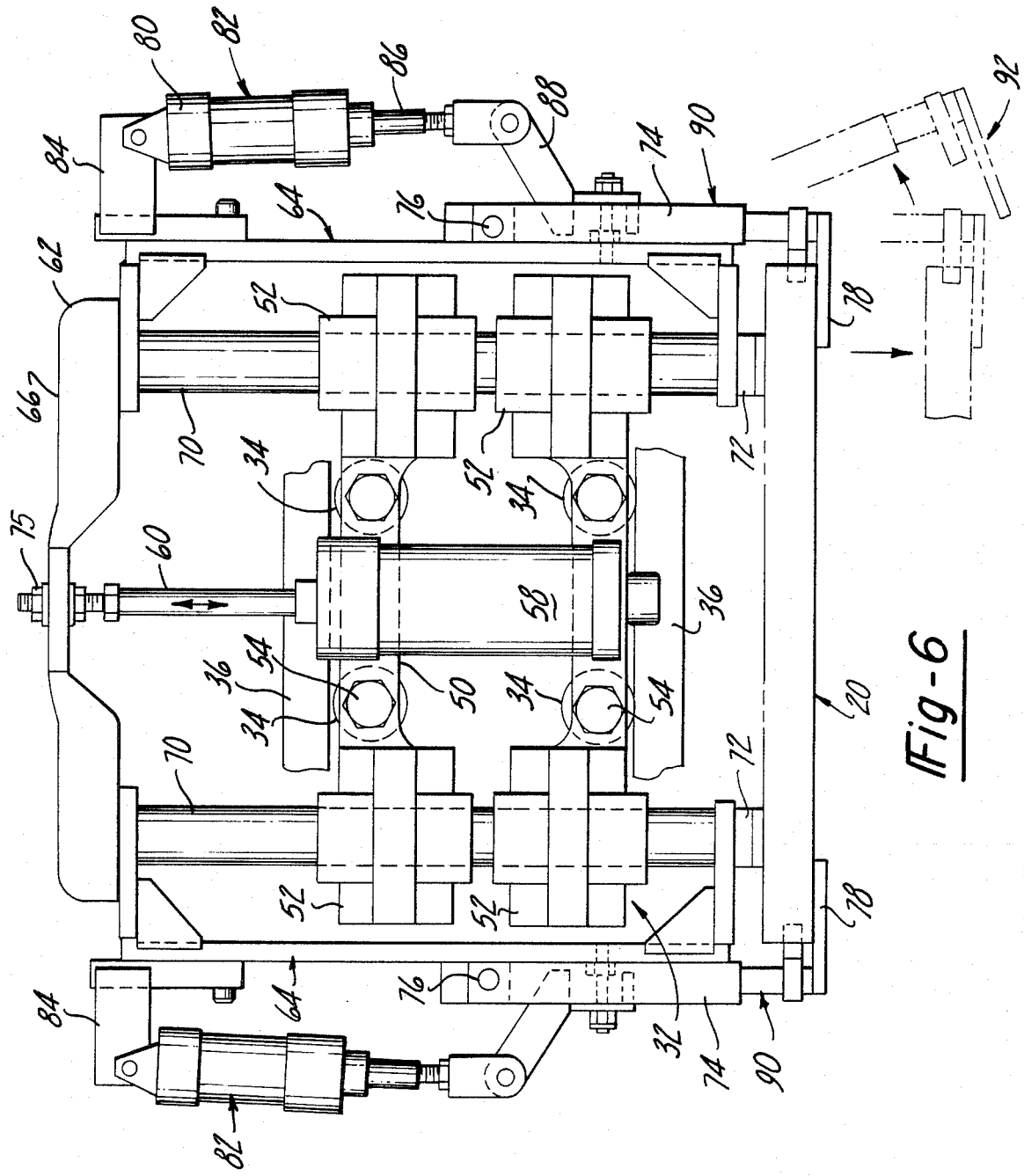
FIG. 6 is a fragmentary partial sectional view illustrating a preferred embodiment of the carriage assembly of the present invention, taken substantially along line 6 in FIG. 2 and enlarged for clarity.

With reference now particularly to FIG. 6, a portion of the carriage assembly 32 is thereshown in greater detail and comprises a main body 50 having four vertically oriented bushings 52. The rollers 34 are secured to the main body 50 by axles 54 so that the rollers 34 enable the main body 50 to slide along the rails 36 but prevent vertical movement of the main body 50 with respect to the rails 36. A fluid operated cylinder 58 is secured to the main body 50 of the carriage assembly 32 and includes an actuating rod 60 which extends vertically upwardly from the cylinder 58. The rod 60, which is movable between an upper and a lower position upon actuation of the cylinder 58, is illustrated in its upper position in FIG. 6.

Still referring to FIG. 6, the carriage assembly 32 further comprises a vertically movable section 62 having vertically extending side panels 64 which are joined together by an upper cross member 66. Any conventional means, such as welding, can be used to secure the side panels 64 and cross member 66 together. In addition, the vertically movable carriage section 62 includes two vertically extending bearing tubes 70, and each bearing tube is slidably positioned through two of the bushings 52. A guide block 72 is secured to the lower end of each bearing tube 70 for a reason to be subsequently described.

The actuator rod 60 from the fluid operated cylinder 58 is secured by fasteners 75 to the cross member 66. Consequently, actuation of the cylinder 58 vertically displaces the vertically movable carriage section 62 with respect to the carriage assembly main body 50. The carriage section 62 is movable between an upper position, shown in solid line in FIG. 6 and a lower position, shown in phantom line in FIG. 6.

Still referring to FIG. 6, an arm 74 is pivotally secured by a pin 76 to each side panel of the vertically movable carriage section 62. Each arm 74 includes a finger 78 at its lower end which is spaced downwardly from the guide block 72 by a predetermined distance which is substantially the same or slightly greater than the thickness of the workpiece 20. Furthermore, the side panels 64 and arm 74 are spaced from each other by a distance slightly greater than the width of the workpiece 20 so that, with the workpiece 20 positioned in the receiving chamber formed between the guide block 72 and fingers 78, the fingers 78 extend underneath and support the workpiece 20.

The cylinder 80 of a piston and cylinder arrangement 82 is attached by a bracket 84 to the upper end of each side panel 64. The piston 86 of the piston and cylinder arrangement 82 is pivotally secured to a bracket 88 extending outwardly from each arm 74. Consequently, extension of the piston 86 from the cylinder 80 moves the arm 74 to the closed position shown in solid line at 90 so that the fingers 78 extend underneath opposite sides of the workpiece 20. Conversely, upon retraction of the pistons 86 into their respective cylinders 80, the piston and cylinder arrangements 82 pivot the arms 74 outwardly away from each other to the open position shown in phantom line at 92. In doing so, the fingers 78 move out from underneath the bottom of the workpiece 20 and permit the workpiece 20 to drop downwardly from the carriage assembly 32.

With reference now to FIGS. 2, 3 and 5, a pair of vertically extending framing members 100 are secured by rearwardly extending supports 102 (FIG. 5) to the main body 50 of the carriage assembly. The lower ends 104 of the framing members 100 are spaced upwardly from the wheel conveyor 14 as best shown in FIG. 5.

With reference now particularly to FIGS. 2 and 5, a coupling member 106 is pivotally secured by a pin 108 to and between the framing members 100 adjacent their lower end 104. The cylinder 110 of a piston and cylinder arrangement 112 is secured by an axle 114 between the framing members 100 near their upper end while the piston 116 is secured to a bracket 118 secured to the coupling member 106 and extending radially outwardly from the coupling pivot pin 108. Consequently, with the piston 116 in its retracted position, the coupling member 106 is moved downwardly toward the conveyor wheel 14 to the position shown in solid line (FIG. 5). Conversely, upon extension of the piston 116 from its cylinder 110, the piston and cylinder arrangement 112 pivots the coupling member 106 upwardly from the conveyor wheel 14 to the position shown in phantom line (FIG. 5).

With reference now to FIGS. 4 and 5, an upwardly extending abutment member 120 (FIG. 5) is associated with each work holding station 18 on the conveyor wheel 14. The abutment member 120 is dimensioned so that, with the coupling member 106 in its lower or coupling position, the abutment member 120 engages one side of the coupling member 106 as the conveyor wheel 14 rotates. When this occurs, the conveyor wheel 14 causes the carriage assembly 32 to slide along the arcuate rails 36 along the same path of movement as and in unison with the conveyor wheel 14. As best shown in FIG. 4, with the coupling member 106 in its lower coupling position, the abutment member 120 causes the carriage assembly 32 to slide from the first position 40, shown in solid line and in which the carriage assembly 32 is aligned with the entry station 24, and the second position, shown in phantom line at 42, in which the carriage assembly 32 is spaced away from its first position along the path of movement of the conveyor wheel 14.

With reference again to FIG. 5, the extension of the piston 116 from the cylinder 110 pivots the coupling member 106 to its upper or uncoupled position as shown in phantom line. In its uncoupled position, the abutment member 120 does not engage, but rather passes underneath, the coupling member 106.

With reference now particularly to FIGS. 1 and 4, an air spring 150 has its cylinder 152 pivotally secured by a pin 154 to the housing 10. The piston rod 156 is pivotally secured by a pin 158 (FIG. 4) to a bracket 140 on the main body of the carriage assembly 32. During operation of the device of the present invention, whenever the coupling member 106 engages an abutment member 120 and moves the carriage assembly to its second position 42 (FIG. 4), the piston rod 156 extends outwardly from its cylinder 152. After the coupling member 106 is moved to its uncoupled position, the air spring 150, which is under power or tension at all times, positively retracts the piston rod 156 inside its cylinder 152 and returns the carriage assembly 32 from its second position 42 and to its first position whereupon the carriage assembly 32 is again aligned with the entry station 24. Alternatively, a mechanical spring could be used in lieu of the air spring 150.

With reference now particularly to FIG. 2, a loader assembly 130 is provided in the entry station 24 for loading the workpieces 20 into the carriage assembly 32. The loader assembly 130 comprises a pusher 132 having at least one pusher dog 134 pivotally secured to it. The pusher 132 is movable by a fluid operation piston and cylinder 136 between a retracted position shown in phantom line and an extended position shown in solid line. In its retracted position, the pusher dogs 134 are positioned behind the workpiece 20 while selectively actuated stops 138 limit the movement by the roller conveyor 26 of the workpiece 20 toward the carriage assembly 32. When the carriage assembly 32 is in its first position, i.e., aligned with the entry station 24, the stops 138 are moved out of engagement with the workpiece 20 and the piston and cylinder 136 is actuated to move the pusher 132 along with the workpiece 20 to its extended position. In doing so, the pusher 132 loads the workpiece 20 into the carriage assembly receiving chamber between the guides 72 and the finger 78 of the arms 74 (FIG. 6).

The operation of the workpiece transfer device will now be described. Assuming that a workpiece is not positioned in the entry station 24, the carriage assembly 32 is first moved to its first position and the vertically movable carriage section 62 is moved to its upper position. In addition, the pusher 132 is moved to its retracted position shown in phantom line in FIG. 2. At the same time, the arms 74 are moved to their closed position shown in solid line in FIG. 6 so that the receiving chamber of the carriage assembly 32 is aligned with the entry station 24.

A workpiece 20 is then placed on the outer end 30 of the roller conveyor 26 (FIG. 2) and the roller conveyor 26 transports the workpiece 20 to the position shown in FIG. 2 and against the stop 138. As the workpiece 20 is transported from the entry end 30 of the roller conveyor 26 and against the stop 138, the pusher dogs 134 pivot upwardly and allow the workpiece 20 to pass underneath the pusher dogs 134. Once the workpiece 20 engages the stop 138, however, the pusher dogs 134 fall downwardly and behind the rear end of the workpiece 20 as shown in phantom line in FIG. 2.

Thereafter, the stop members 138 are moved out of engagement with the workpiece 20 and the piston and cylinder 136 is actuated to move the pusher 132 along with the workpiece 20 to a position shown in solid line in FIG. 2. In doing so, the pusher 132 loads the workpiece 20 in between the guides 72 and arm fingers 78 as shown in FIG. 6. The pusher 132 is then moved to its retracted position and the stop member 138 is moved to the position shown in FIG. 2 to limit the travel of a subsequent workpiece on the conveyor 30 towards the carriage assembly 32.

As previously described, the conveyor wheel 14 is continuously rotatably driven while the workpiece 20 is loaded from the entry station 24 and onto the carriage assembly 32. However, the coupling member 106 is maintained in its upper uncoupled position, shown in phantom line in FIG. 5, so that the abutment members 120 do not engage the coupling member 106. After the workpiece 20 is loaded into the carriage assembly receiving chamber, however, the piston and cylinder 112 (FIG. 5) is actuated thus retracting the piston rod 116 into its cylinder 110 and pivoting the coupling member 106 to its lower coupling position. Consequently, the next abutment member 120 on the conveyor wheel 14 will abut against or engage the coupling member 106.

Upon the continued rotation of the conveyor wheel 14, the next abutment member 120 engages the now lowered coupling member 106. The conveyor wheel 14 then drives the carriage assembly in unison with it along the rails 36 and from its first position 40 and towards its second position 42 (FIG. 4).

Simultaneously as the carriage assembly is moved by the conveyor wheel 14 from its first and towards its second position, the piston and cylinder 58 (FIG. 6) is actuated thus retracting the piston 60 within its cylinder and moving the vertically movable carriage section 62 along with the workpiece 20 downwardly toward the conveyor wheel 14. The carriage assembly is designed so that, when the carriage assembly is in its second position 42 (FIG. 4) the workpiece 20 substantially flatly abuts against a work holding station 18 on the conveyor wheel 14. At that time, the piston and cylinders 82 are actuated thus moving the arms 74 outwardly to their open position shown at 92 in FIG. 6 and thus releasing the workpiece 20 onto the work support 18.

Following release of the workpiece 20 by the arm 74, the cylinder 58 (FIG. 6) is again actuated thus raising the carriage section 62 to prevent subsequent interference between the carriage assembly 32 and the workpiece 20. The arms 74 are simultaneously moved to their closed position 90 (FIG. 6) and the coupling member 106 (FIG. 5) is moved by the piston and cylinder 112 to its upper uncoupled position. The air spring 150 (FIG. 4) then positively returns the carriage assembly 32 from its second position 42 (FIG. 4) and to its first position 40 in which the carriage assembly 32 is aligned with the entry station 24 and ready for the receipt of a subsequent workpiece. The above described process is then repeated.

It will be understood, of course, that appropriate limit switches or the like are utilized to control the sequence of the operation of the various piston and cylinder arrangements and other components of the device. Such limit switches, however, are conventional in construction so that a further description thereof is unnecessary.

A primary advantage of the transfer device of the present invention is the provision of the coupling member 106 in conjunction with the abutment members 120 which automatically synchronize the position of the carriage assembly 32 with the conveyor wheel 14 despite the continuous rotation of the conveyor wheel 14. As such, the coupling member 106 automatically orients and aligns the workpiece carried by the carriage assembly with the workpiece holder 18.

Having described my invention, however, many modifications thereto will become apparent to those skilled in the art to which it pertains without deviation from the spirit of the invention as defined by the scope of the appended claims.

We claim:

1. A device for transferring workpieces from an entry station and to a predetermined position on a moving conveyor comprising:
   a housing, at least a portion of said conveyor extending through said housing and movable along a predetermined path of movement,
   a carriage assembly,
   means for slidably mounting said carriage assembly to said housing along at least a portion of said path of movement so that said carriage assembly is movable from a first position, in which said carriage assembly is aligned with said entry station, and a second position spaced away from said first position along said path of movement, said carriage assembly comprising:

means for receiving and holding a workpiece from said entry station when said carriage assembly is in said first position, means actuatable after receipt of a workpiece by the carriage assembly for coupling said carriage assembly to a predetermined position of said conveyor so that said carriage assembly moves in unison with said conveyor from said first position and towards said second position, means for releasing said workpiece onto said conveyor when said carriage assembly is in said second position, means for deactuating said coupling means following the release of said workpiece onto said conveyor, means actuatable following said uncoupling of said carriage assembly from said conveyor for returning said carriage assembly to said first position, and means for loading said workpiece from said entry station and to said carriage assembly comprising a pusher assembly and means for moving said pusher assembly between a retracted position and an extended position wherein in said retracted position said pusher assembly engages a workpiece in said entry station, wherein in said extended position, said pusher assembly moves said workpiece into said holding and receiving means.

2. The invention as defined in claim 1 wherein said coupling means comprises:

at least one abutment member on said conveyor, and means secured to said carriage assembly for selectively engaging said abutment member.

3. The invention as defined in claim 2 wherein said engaging means comprises a piston and cylinder assembly.

4. The invention as defined in claim 1 wherein said receiving and holding means comprises a pair of arms which engage opposite sides of said workpiece, and means for pivoting said arms away from each other to an open position when said carriage assembly is in said second position.

5. The invention as defined in claim 4 wherein said conveyor is vertically spaced from said entry station and further comprising means for moving said arms downwardly toward said conveyor as said carriage assembly moves from said first position and toward said second position.

6. The invention as defined in claim 4 wherein each arm includes a finger which extends underneath the workpiece when said arms are in a closed position.

7. The invention as defined in claim 1 wherein said slidable mounting means comprises at least one rail secured to said housing so that said rail extends along said path of movement, and means for slidably mounting said carriage assembly to said at least one rail.

8. The invention as defined in claim 1 and comprising a second conveyor for transporting workpieces towards said first mentioned conveyor and to said entry station, and means for selectively holding said workpieces in said entry station when said carriage assembly is moved from said first position.

9. A device for transferring workpieces from an entry station and to a predetermined position on a moving conveyor comprising:

a housing, at least a portion of said conveyor extending through said housing and movable along a predetermined path of movement, a carriage assembly, means for slidably mounting said carriage assembly to said housing along at least a portion of said path of movement so that said carriage assembly is movable from a first position, in which said carriage assembly is aligned with said entry station and a second position spaced away from said first position along said path of movement, said carriage assembly comprising:

means for receiving and holding a workpiece from said entry station when said carriage assembly is in said first position, means actuatable after receipt of a workpiece by the carriage assembly for coupling said carriage assembly to a predetermined position of said conveyor so that said carriage assembly moves in unison with said conveyor from said first position and towards said second position, means for releasing said workpiece onto said conveyor when said carriage assembly is in said second position, means for deactuating said coupling means following the release of said workpiece onto said conveyor, and means actuatable following said uncoupling of said carriage assembly from said conveyor for returning said carriage assembly to said first position, wherein said conveyor comprises a continuously rotatably driven conveyor wheel.

* * * * *